United States Patent
Holtcamp et al.

(10) Patent No.: US 9,102,844 B2
(45) Date of Patent: Aug. 11, 2015

(54) METAL POLYMERYLS AND THE POLYMER SOLUBILIZED SURFACES DERIVED THEREFROM

(71) Applicant: ExxonMobil Chemical Patents Inc., Baytown, TX (US)

(72) Inventors: Matthew W. Holtcamp, Huffman, TX (US); Patrick Brant, Seabrook, TX (US); Donna J. Crowther, Seabrook, TX (US); John R. Hagadorn, Houston, TX (US); Gregory S. Day, Pasadena, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 11 days.

(21) Appl. No.: 14/100,303

(22) Filed: Dec. 9, 2013

(65) Prior Publication Data

US 2014/0179862 A1    Jun. 26, 2014

Related U.S. Application Data

(60) Provisional application No. 61/740,169, filed on Dec. 20, 2012.

(51) Int. Cl.
| | |
|---|---|
| *C09D 123/12* | (2006.01) |
| *C08F 210/06* | (2006.01) |
| *C08F 8/06* | (2006.01) |

(Continued)

(52) U.S. Cl.
CPC ............... *C09D 123/12* (2013.01); *C08F 4/52* (2013.01); *C08F 8/06* (2013.01); *C08F 10/04* (2013.01); *C08F 110/06* (2013.01); *C08F 210/06* (2013.01); *C09D 123/10* (2013.01)

(58) Field of Classification Search
None
See application file for complete search history.

(56) References Cited

U.S. PATENT DOCUMENTS

| | | |
|---|---|---|
| 3,914,342 A | 10/1975 | Mitchell |
| 4,923,918 A | 5/1990 | Komori et al. |

(Continued)

FOREIGN PATENT DOCUMENTS

| | | |
|---|---|---|
| WO | 2011/016992 | 2/2011 |
| WO | WO 2012/063128 | 5/2012 |

OTHER PUBLICATIONS

Yanjarappa et al., Prog. Polym. Sci., 2002, Elsevier, 27, p. 1347-1398.*

(Continued)

*Primary Examiner* — Satya Sastri
(74) *Attorney, Agent, or Firm* — Kevin M. Faulkner

(57) ABSTRACT

Disclosed herein are certain propylene-based metal polymerals and their use in modifying surfaces, and, in general, metal polymerals used in modifying surfaces. In one aspect is a metal polymeryl comprising compounds having the general formula: $MR_{3-n}R'_n$; wherein each R group is a hydrogen or $C_1$ to $C_{10}$ or $C_{20}$ alkyl, and each R' group is selected from propylene-based polymers having an Mn of at least 300 g/mole; n is 1, 2, or 3; and M is a Group 12 or 13 metal, preferably aluminum or zinc; wherein the first portion of the R' group bound to the metal M is a —$CH_2CH_2$— group, and the terminal portion of the R' group is isobutyl. Surfaces that are modified or "solubilized" include particles of silica or alumina, glass, metal, clay and other hydroxyl-containing materials of all sizes.

23 Claims, 1 Drawing Sheet

Example Reaction Scheme silica, alumina, clay

(51) Int. Cl.
*C08F 110/06* (2006.01)
*C09D 123/10* (2006.01)
*C08F 10/04* (2006.01)
*C08F 4/52* (2006.01)

(56) References Cited

U.S. PATENT DOCUMENTS

| | | | |
|---|---|---|---|
| 5,401,313 | A | 3/1995 | Supplee et al. |
| 2009/0318644 | A1 | 12/2009 | Brant et al. |
| 2009/0318646 | A1 | 12/2009 | Brant et al. |
| 2011/0028654 | A1 | 2/2011 | Sita et al. |

OTHER PUBLICATIONS

Yanjarappa, M J et al., "Recent developments in the synthesis of functional poly(olefin)s", Progress in Polymer Science, vol. 27, No. 7, Sep. 1, 2002, pp. 1347-1398.

Bhriain, N. et al. "Polymeryl Exchange between ansa-Zirconocene Catalysts for Norbornene-Ethene Copolmerization and Aluminum or Zinc Alkyls," in 38 Macromolecules 2056-2063 (2005).

Camara, J.M. et al. "Zirconium-Catalyzed Carboalumination of a-Olefins and Chain Growth of Aluminum Alkyls" Kinetics and Mechanism, in 133 J. Am. Chem.Soc. 5263-5273 (2011).

Li, Z. et al., "In Situ Catalytic Encapsulation of Core-Shell Nanoparticles Having Variable Shell Thickness: Dielectric and Energy Storage Properties of High-Permittivity Metal Oxide Nanocomposites," in 22 Chem. Matter. 5154-5164 (2010).

Milner S.T, "Polymer Brushes" in 251 Science 905-914 (1991).

Quintanilla, E. et al., "Chain transfer to aluminum in MAO-activated metallocene-catalyzed polymerization reactions," in Chem. Commun. 4309-4311 (2006).

Tritto, I et al., "Evidence of Zirconium-Polymeryl Ion pairs from $^{13}$C NMR in situ $^{13}C_2H_4$ Polymerization with $Cp_2Zr(^{13}CH_3)_2$-Based Catalysts," in 32 Macromolecules 264-269 (1999).

Zhang, M. et al. "Modeling of a-Olefin Copolymerization with Chain-Shuttling Chemistry Using Dual Catalysts in Stirred-Tank Reactors: Molecular Weight Distributions and Copolymer Compositions," in 49 Ind. Eng. Chem. Res. 8135-8146 (2010).

* cited by examiner

FIGURE 1. Example Reaction Scheme
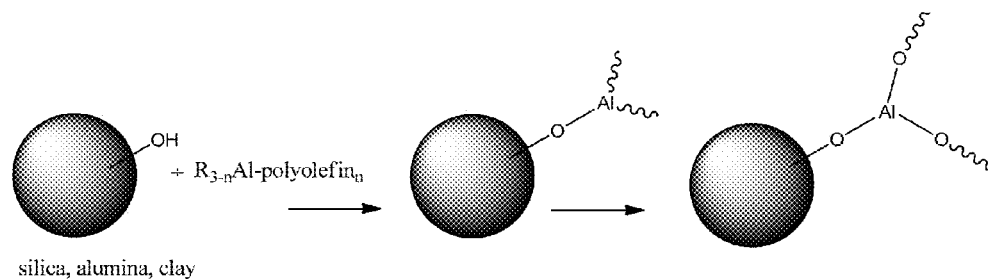
FIGURE 2. Cabosil Silica (1) in organic solvent and (2) polymer-solubilized invention
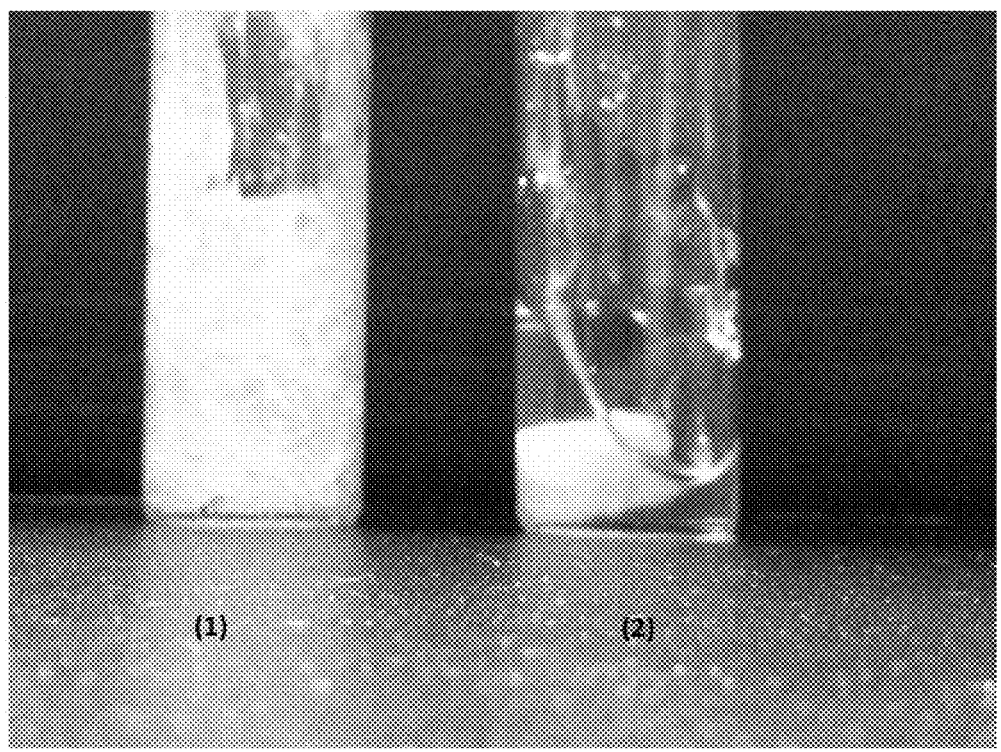

METAL POLYMERYLS AND THE POLYMER SOLUBILIZED SURFACES DERIVED THEREFROM

CROSS-REFERENCE TO RELATED APPLICATIONS

This application claims the benefit of Provisional Application No. 61/740,169, filed Dec. 20, 2012 and EP 13162542.8 filed Apr. 5, 2013.

FIELD OF THE INVENTION

The present invention relates in general to reaction between hydroxyl-containing solids and metal polymeryls, and more particularly to the formation of a metal polymeryl from vinyl-terminated polypropylenes and the formation of polymeryl-modified solid surfaces that comprise hydroxyl groups.

BACKGROUND OF THE INVENTION

A simple, inexpensive coupling route to form readily well-dispersed nanocomposites, as well as pigments and other solid agents to enhance polyolefin performance or deliver key attributes, is sought. In particular, it is desirable to combine solid materials such as silica or alumina with polymer such as polyolefins and form a well-blended, or "solubilized," system, similar to so-called "polymer brushes" of S. T. Milner "Polymer Brushes" in 251 SCIENCE 905-914 (1991). The inventors have discovered a means of forming such systems by forming metal polymeryls that can react with hydroxyl-containing solids (or surfaces) to modify or solubilize such surfaces. It is expected this and related approaches offer competitive alternatives to silane coupling chemistry.

Relevant art includes U.S. Patent Application Publication No. 2011/0028654; I. Tritto et al., "Evidence of Zirconium-Polymeryl Ion pairs from $^{13}$C NMR in situ $^{13}C_2H_4$ Polymerization with $Cp_2Zr(^{13}CH_3)_2$-Based Catalysts," in 32 MACROMOLECULES 264-269 (1999); N. Bhriain et al. "Polymeryl Exchange between ansa-Zirconocene Catalysts for Norbornene-Ethene Copolymerization and Aluminum or Zinc Alkyls," in 38 MACROMOLECULES 2056-2063 (2005); E. Quintanilla et al., "Chain transfer to aluminum in MAO-activated metallocene-catalyzed polymerization reactions," in CHEM. COMMUN. 4309-4311 (2006); M. Zhang et al. "Modeling of α-Olefin Copolymerization with Chain-Shuttling Chemistry Using Dual Catalysts in Stirred-Tank Reactors: Molecular Weight Distributions and Copolymer Compositions," in 49 IND. ENG. CHEM. RES. 8135-8146 (2010); Z. Li et al., "In Situ Catalytic Encapsulation of Core-Shell Nanoparticles Having Variable Shell Thickness: Dielectric and Energy Storage Properties of High-Permittivity Metal Oxide Nanocomposites," in 22 CHEM. MATER. 5154-5164 (2010); and J. M. Camara et al. "Zirconium-Catalyzed Carboalumination of α-Olefins and Chain Growth of Aluminum Alkyls: Kinetics and Mechanism," in 133 J. AM. CHEM. SOC. 5263-5273 (2011).

SUMMARY OF THE INVENTION

The invention(s) disclosed herein includes certain particular propylene-based metal polymerals and their use in modifying surfaces, and, in general, metal polymerals used in modifying or "solubilizing" surfaces. Thus, the inventors disclose a metal polymeryl comprising compounds having the general formula: $MR_{3-n}R'_n$; wherein each R group is a hydrogen or $C_1$ to $C_{10}$ or $C_{20}$ alkyl, and each R' group is selected from propylene-based polymers having an Mn of at least 300 g/mole; n is 1, 2, or 3; and M is a Group 12 or 13 metal, preferably aluminum or zinc; wherein the first portion of the R' group bound to the metal M is a $-CH_2CH_2-$ group, and the terminal portion of the R' group is isobutyl.

Also disclosed is a polymer-solubilized surface "S" comprising multiple hydroxyl groups ("S—OH"), wherein at least one of the hydroxyl groups is modified according to the formula $S-O-MR_{2-n}R'_n$, wherein each R group is a hydrogen or $C_1$ to $C_{10}$ or $C_{20}$ alkyl, and each R' group is a polymer having an Mn of at least 300 g/mole; n is 1 or 2; and M is a Group 12 or 13 metal, preferably aluminum or zinc.

And also disclosed is a polymer-solubilized surface comprising the reaction product of a surface comprising hydroxyl moieties and a metal polymeryl $MR_{3-n}R'_n$; wherein each R group is a hydrogen or $C_1$ to $C_{10}$ or $C_{20}$ alkyl, and each R' group is a polymer having an Mn of at least 300 g/mole; n is 1, 2, or 3; and M is a Group 12 or 13 metal, preferably aluminum or zinc.

And also disclosed is a method of making a metal polymeryl comprising: combining a vinyl-terminated propylene-based polymers having an Mn of at least 300 g/mole with $MR_3$; wherein each R group is independently selected from a hydrogen or $C_1$ to $C_{10}$ alkyl, and M is a Group 12 or 13 metal, preferably aluminum or zinc; and isolating a metal polymeryl having the structure $MR_{3-n}R'_n$; wherein each R group is a hydrogen or $C_1$ to $C_{10}$ or $C_{20}$ alkyl, and each R' group is the propylene-based polymer; n is 1, 2, or 3; wherein the first portion of the R' group bound to the metal M is a $-CH_2CH_2-$ group, and the terminal portion of the R' group is isobutyl.

And, finally, disclosed is a method of producing a polymer-solubilized surface comprising combining a vinyl-terminated polyolefin having an Mn of at least 300 g/mol with $MR_3$; wherein each R group is independently selected from a hydrogen or $C_1$ to $C_{10}$ alkyl, and M is a Group 12 or 13 metal, preferably aluminum or zinc; isolating a metal polymeryl having the structure $MR_{3-n}R'_n$; wherein each R group is a hydrogen or $C_1$ to $C_{10}$ or $C_{20}$ alkyl, and each R' group is the polyolefin; n is 1, 2, or 3; combining the metal polymeryl with a surface comprising hydroxyl moieties to form a polymer-solubilized surface.

The various descriptive elements and numerical ranges disclosed herein for the polymerals and modified surfaces, or methods of making the polymerals and modified surfaces, can be combined with other descriptive elements and numerical ranges to describe the invention(s); further, for a given element, any upper numerical limit can be combined with any lower numerical limit described herein.

DESCRIPTION OF THE DRAWINGS

FIG. 1 is a scheme of forming the polymer solubilized surfaces of the invention, wherein the surface is a hydroxide-containing particle.

FIG. 2 is a photograph of (1) a before picture of Cabosil™ silica suspended in polymer melt in Comparative Example 1, and (2) an after picture of the same Cabosil having been solubilized using a metal polymeryl as Example 1.

DETAILED DESCRIPTION

The inventors have found, as described herein, a novel means of combining an otherwise solid or insoluble material with a polymer matrix to form an intimate blend or "solution" of the insoluble material and the polymer. In solubilizing such material, at least the solvent-exposed areas of the materials are modified by reaction with metal polymeryls. Thus, described herein is a polymer-solubilized solid or surface "S" and method of solubilizing such surfaces, the solubilized surface comprising multiple hydroxyl groups ("S—OH"), wherein at least one of the hydroxyl groups is modified with at least one oligomer or polymer ("polymer") group R' having a number average molecular weight (Mn) of at least 300 g/mole. Stated another way, the inventors have found a polymer-solubilized surface comprising the reaction product of a surface comprising hydroxyl moieties and a metal polymeryl $MR_{3-n}R'_n$; wherein each R group is a hydrogen or $C_1$ to $C_{10}$ or $C_{20}$ alkyl, each R' group is the polymer; and M is a Group 4, 12, or 13 metal, preferably aluminum or zinc, and n is 1, 2, or 3.

This polymer-solubilized surface or reaction product can be performed in a reactor or two reactors that result in in-situ blending capability with as-produced polyolefin, or can be practiced continuously, for example, in an extruder with chemical tethering inorganic materials with polymers including polyolefins. In either case, the solid state benefits of the inventive approach can include: optimal increase in stiffness per unit volume of filler, improved stiffness-toughness, improved barrier, crack, and puncture resistance, and uniform color dispersion. Further, it is anticipated that these new compositions can be designed to dissolve in hydrocarbon liquids and may prove useful for their unique viscosity characteristics. These can be designed for, and used as, new coatings under appropriate controlled conditions, and provide new strategies for reduced corrosion, adhesion, and so on. Block copolymers should also be possible based on this approach. It is expected the invention(s) and related approaches offer competitive alternatives to silane coupling chemistry.

The invention(s) has many applications, and though referring to "polymer solubilized surfaces," in fact the metal polymeryls described herein may be used to coat or otherwise modify surfaces that remain in their bulk solid form and do not "solubilize." An example of a surface actually becoming solubilized is in FIG. 2, where Cabosil™ silica is dispersed in a vinyl-terminated polypropylene as described in Comparative Example 1. FIG. 2(1) shows visually the results of this mixture. In Example 1, a molten polymeryl is added to the suspension of Cabosil, and the suspension becomes clear as the suspended silica disperses into the molten polymer, shown visually in FIG. 2(2). The invention is thus useful in such applications as forming polymer/filler nanocomposites, coatings on solid (metal, polymer, glass, etc.) surfaces to enhance their properties, and other applications.

As described herein, a "solid" or "surface" is a material that is not soluble in organic diluents such as hexane, toluene, or molten polyolefins, and comprise at least one hydroxyl group that is available for condensation or substitution reactions with a metal polymeryl as described herein. Examples of surfaces include particles (of any size) of silica, silica-alumina, alumina, (and spray-dried versions thereof) glass, clay and ceramics; glass fibers or particles; glass surfaces; graphene oxide, carbon black; calcium carbonate; oxidized polyolefin films; transition metal nanoparticles and metal oxide nanoparticles; and metal surfaces. Particularly preferred surfaces include particles of silica, silica-alumina, alumina, or mixtures thereof having an average particle size within the range of from 1 or 4 or 10 μm to 20 or 50 or 100 μm. The surface can also be described in a particular embodiment as comprising solvent-insoluble particles comprising surface hydroxyl moieties or one or more macroscopic surfaces.

As described herein, a "polymeryl" or "metal polymeryl" is a compound comprising a metal and a polymer radical having a number average molecular weight of at least 300 g/mole. The metal can be most any metal, but is preferably a Group 4, 12, or 13 metal, and most preferably aluminum or zinc. The polymer portion is derived from any desirable polymer having vinyl or other moiety capable of forming a chemical bond with the metal one or more positions, preferably only one position on the polymer. A particularly preferred polymer from which the polymeryl derives is a vinyl-terminated polymer, vinyl-terminated propylene-based polymers most particularly. The inventive aluminum polymeryls derived from vinyl-terminated propylene-based polymers described herein will have a characteristic $^1$H NMR signal for the Al—C$\underline{H}_2$CH$_2$(polymer) and is within the range of δ from 0.25 or 0.30 or 0.32 to 0.40 or 0.42 or 0.45 ppm (broad) under the conditions described in the examples. Once the aluminum polymeryl has reacted with an oxidizing agent the characteristic $^1$H NMR signal Al—OC$\underline{H}_2$CH$_2$(polymer) is within the range of δ from 3.2 or 3.5 or 3.8 to 4.2 or 4.5 or 4.8 ppm (broad) under the conditions described in the examples, referenced to deuterated benzene or toluene.

As described herein, "propylene-based polymers" are those polymers that comprise greater than 50 wt % or 60 wt % or 70 wt % or 80 wt % propylene-derived units, and preferably comprise from 50 wt % or 60 wt % or 80 wt % to 95 wt % or 99 wt % or 100 wt % propylene-derived units, the remainder being ethylene or $C_4$ to $C_{10}$ α-olefin-derived units. Desirable propylene-based polymers include homopolymers, copolymers, elastomers, impact copolymers, block copolymers, isotactic polypropylene, atactic polypropylene, syndiotactic polypropylene, and mixtures thereof Any of these may be vinyl-terminated, as described below, and/or may contain multiple vinyl groups pendant to the polymer chain.

Finally, as described herein, "vinyl-terminated polyolefins," "vinyl-terminated propylene-based polymers" and other "vinyl-terminated" polymers are polymers as described in U.S. Patent Application Publication No. 2009/0318644 having at least one terminus (CH$_2$CH—CH$_2$-oligomer or polymer) represented by formula (I):

allylic vinyl end group where the "∿∿" represents the oligomer or polymer chain. In a preferred embodiment the allyl chain ends is represented by the formula (II):

The amount of allyl chain ends is determined using $^1$H NMR at 120° C. using deuterated tetrachloroethane as the solvent on a 500 MHz machine, and in selected cases confirmed by $^{13}$C NMR. These groups, (I) and (II), will react to form a chemical bond with a metal as mentioned above to form the M-CH$_2$CH$_2$-polymer. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker A M 300 spectrometer operating at 300 MHz for proton and 75.43

MHz for carbon) for vinyl-terminated propylene polymers in Resconi et al, 114 J. AM. CHEM. SOC. 1025-1032 (1992), that are useful herein.

The vinyl-terminated propylene-based polymers may also contain an isobutyl chain end. "Isobutyl chain end" is defined to be an oligomer having at least one terminus represented by the formula (III):

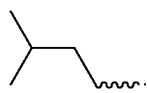
(III)

In a preferred embodiment, the isobutyl chain end is represented by one of the following formulae:

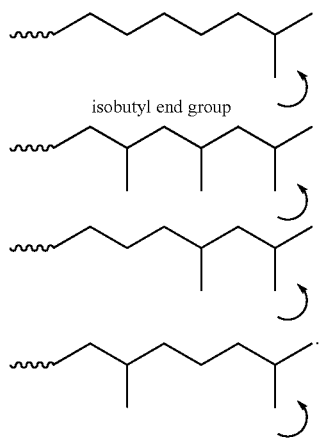

isobutyl end group

The percentage of isobutyl end groups is determined using $^{13}C$ NMR (as described in the example section) and the chemical shift assignments in Resconi for 100% propylene oligomers. Preferably, the vinyl-terminated polymers described herein have an allylic terminus, and at the opposite end of the polymer an isobutyl terminus Thus, the polymeryls described herein may have the structure M-CH$_2$CH$_2$-polymer, most preferably M-CH$_2$CH$_2$-polymer-isobutyl, preferably the propylene-based polymeryls based on vinyl-terminated propylene-based polymers. When modified with the vinyl-terminated propylene-based polymers, the solubilized surfaces described herein will have the structures S—CH$_2$CH$_2$-polymer-isobutyl or S—OCH$_2$CH$_2$-polymer-isobutyl, where "S" is the hydroxyl-containing surface. The vinyl-terminated propylene-based polymers may have only the one terminal vinyl group, but in certain embodiments may have multiple vinyl groups throughout the polymer chain.

The polymeryls are not limited to propylene-based polymeryls. The solvent solubilized surfaces described herein may be formed from polymeryls made from any desirable polymer, especially polyolefins, such as polyethylenes, branched polyethylenes, high density polyethylene, linear low density polyethylene, polystyrenes, polybutylenes, ethylene-propylene copolymers, ethylene-propylene-butene terpolymers, EPDM terpolymers, and other α-olefin or styrenic homopolymers and copolymers. When referring to "polymeryls" that comprise a "polymer," it is understood that the polymer is a polymeric chain that has at least one reactive group such as a vinyl group that has reacted with a metal and thus is bound to a metal, thus, strictly speaking, the polymeryl comprises a metal and a polymer radical.

Thus, in particular the inventors find particular propylene-based polymers to be novel. The metal polymeryls comprise compounds having the general formula: MR$_{3-n}$R'$_n$; wherein each R group is a hydrogen or C$_1$ to C$_{10}$ or C$_{20}$ alkyl, and each R' group is selected from propylene-based polymers having an Mn of at least 300 g/mole; n is 1, 2, or 3; and M is a Group 12 or 13 metal, preferably aluminum or zinc. The first portion of the R' group bound to the metal M in these propylene-based polymerals is a —CH$_2$CH$_2$— group, and the terminal portion of the R' group is isobutyl. Aluminum polymeryls derived from vinyl-terminated propylene-based polymers described herein will have a characteristic $^1H$ NMR signal for the Al—C H$_2$CH$_2$(polymer) and is within the range of δ from 0.25 or 0.30 or 0.32 to 0.40 or 0.42 or 0.45 ppm (broad) under the conditions described in the examples. The aluminum polymeryl has reacted with an oxidizing agent the characteristic $^1H$ NMR signal Al—OCH$_2$CH$_2$(polymer) and is within the range of δ from 3.2 or 3.5 or 3.8 to 4.2 or 4.5 or 4.8 ppm (broad).

Such metal polymeryls, aluminum or otherwise, have many uses. The polymeryls may be formed into metal alkyl or metal alkoxide clusters. Also, the polymeryls may be combined with a surface comprising hydroxyl moieties to form a modified or solubilized surface. The nature and identity of the surface is not important so long as it comprises hydroxyl groups to allow a reaction to occur between the surface and the polymeryl. Surfaces include particles of silica, silica-alumina, alumina, (and spray-dried versions thereof) glass, clays, ceramics; glass fibers; glass surfaces; graphene oxide, carbon black; calcium carbonate; oxidized polyolefin films; and metal surfaces, and others as described herein.

The M-OCH$_2$CH$_2$(polymer) is derived from reacting the metal polymeryl with an oxidizing agent that inserts an oxygen in the bond to the metal center. The oxidizing agent can be any agent known in the art suitable for such reactions, including oxygen or amine-N-oxide.

The vinyl-terminated propylene-based polymer is a homopolymer of propylene or copolymer of propylene and ethylene or C$_4$ to C$_{10}$ α-olefin, and is selected from the group consisting of isotactic polypropylene, atactic polypropylene, syndiotactic polypropylene, and propylene-ethylene copolymers (random, elastomeric and/or block). Preferably, the vinyl-terminated propylene-based polymer has an Mn value within the range of from 300 or 400 or 500 g/mole to 20,000 or 30,000 or 40,000 or 50,000 or 100,000 or 200,000 or 300,000 g/mole.

The modified, or "solubilized" surface can be described as a polymer-solubilized surface "S" comprising multiple hydroxyl groups ("S—OH"), wherein at least one of the hydroxyl groups is modified according to the formula: S—O-MR$_{2-n}$R'$_n$, wherein each R group is a hydrogen or C$_1$ to C$_{10}$ or C$_{20}$ alkyl, and each R' group is a polymer having an Mn of at least 300 g/mole; n is 1 or 2; and M is a Group 12 or 13 metal, preferably aluminum or zinc. Described another way, the polymer-solubilized surface is the reaction product of, at least a surface comprising hydroxyl moieties and an metal polymeryl MR$_{3-n}$R'$_n$; wherein each R group is a hydrogen or C$_1$ to C$_{10}$ or C$_{20}$ alkyl, preferably R is selected from C$_3$ to C$_6$ alkyls; and each R' group is a polymer having an Mn of at least 300 g/mole; n is 1, 2, or 3; and M is a Group 12 or 13 metal, preferably aluminum or zinc. The polymer may be a propylene-based polymer as discussed above, or can be most any other type of polymer. Preferably, R' is selected from the group consisting of isotactic polypropylene, atactic polypropylene, syndiotactic polypropylene, polyethylene, ethylene-propylene copolymers, and combinations thereof, each having an Mn of at least 300 g/mole, or a value within the range of from 300 or 400 or 500 g/mole to 20,000 or 30,000 or 40,000 or 50,000 or 100,000 or 200,000 or 300,000 g/mole. In certain embodiments, the polymer group R' may have an Mn as low as 100 or 200 g/mole.

The inventors have also found a method for making a metal polymeryl comprising (or consisting essentially of) a vinyl-terminated propylene-based polymers with $MR_3$; wherein each R group is independently selected from a hydrogen or $C_1$ to $C_{10}$ alkyl, and M is a Group 12 or 13 metal, preferably aluminum or zinc; and isolating a metal polymeryl having the structure $MR_{3-n}R'_n$; wherein each R group is a hydrogen or $C_1$ to $C_{10}$ or $C_{20}$ alkyl, and each R' group is a vinyl-terminated propylene-based polymer having an Mn of at least 300 g/mole; n is 1, 2, or 3; wherein the first portion of the R' group bound to the metal M is a —$CH_2CH_2$— group, and the terminal portion of the R' group is isobutyl. The inventors have also found that the metal polymeryls can be stabilized by reaction with an oxidizing agent such as oxygen or an amine-N-oxide.

Once formed, the propylene-based polymeryls can be combined with other polymeryls that are the same or different to form metal alkyl or metal alkoxide clusters. In the alternative, these propylene-based polymeryls can be combined a surface comprising hydroxyl moieties to form a polymer-solubilized surface. As stated above, the R' group, or propylene-based polymer, is a homopolymer of propylene or copolymer of propylene and ethylene or $C_4$ to $C_{10}$ α-olefin, and is preferably selected from isotactic polypropylene, atactic polypropylene, syndiotactic polypropylene, and propylene-ethylene copolymers (random, elastomeric, impact, and/or block).

The polymer-solubilized surface is made by a method comprising combining a vinyl-terminated polyolefin with $MR_3$; wherein each R group is independently selected from a hydrogen or $C_1$ to $C_{10}$ alkyl, and M is a Group 12 or 13 metal, preferably aluminum or zinc; isolating a metal polymeryl having the structure $MR_{3-n}R'_n$; wherein each R group is a hydrogen or $C_1$ to $C_{10}$ or $C_{20}$ alkyl, and each R' group is a polymer having an Mn of at least 300 g/mole; n is 1, 2, or 3; combining the metal polymeryl with a surface comprising hydroxyl moieties to form a polymer-solubilized surface. Here, the polymer can be any polymer, as described above, such as any propylene-based, ethylene-based, and/or styrene based polymer. The R' groups can be the same or different and can include a mixture of any of these types of polymers described herein. The inventors have also found that the surface bound metal polymeryls can be stabilized by reaction with an oxidizing agent such as oxygen or an amine-N-oxide.

The vinyl-terminated polyolefin can be any polyolefin having a vinyl-terminal group, as described above, for the vinyl-terminated polypropylenes, and is preferably selected from the group consisting of vinyl-terminated isotactic polypropylenes, atactic polypropylenes, syndiotactic polypropylenes, propylene-ethylene copolymers (random, elastomeric, impact, and/or block), and combinations thereof, each having an Mn of at least 300 g/mole. Preferably, greater than 90% or 94% or 96% of the vinyl-terminated polyolefin comprises terminal vinyl groups; or within the range of from 10% or 20% or 30% to 50% or 60% or 80% or 90% or 95% or 98% or 100%. As described above, the vinyl-terminated polyolefins have an Mn value within the range of from 300 or 400 or 500 g/mole to 20,000 or 30,000 or 40,000 or 50,000 or 100,000 or 200,000 or 300,000 g/mole The polymer-solubilized surface can be made batch-wise in a reactor or continuously such as in an extruder while forming pellets of the finished polymer product having solubilized silica, alumina, clay, or other particles therein. The vinyl-terminated polyolefin and metal alkyl are preferably combined as a melt; and preferably are combined at a temperature of greater than 110° C. or 120° C. or 140° C. or 160° C. The combination can also occur in solvents at the same or lower temperatures. One or both of the combining steps takes place in an extruder that is forming pellets selected from isotactic polypropylene, atactic polypropylene, syndiotactic polypropylene, and propylene-ethylene copolymers (random, elastomeric, impact, and/or block). The finished product may be any desirable surface modified material such as a nanocomposite comprising the polymer-solubilized surface and a polyolefin or elastomer having an Mn of at least 10,000 g/mole, or a coated surface comprising the polymeryls.

As mentioned, the propylene-based or, in general, polymer-based polymeryls have many applications including the formation of improved nanocomposites, capacitors, modified film surfaces, modified metal surfaces to improve corrosion resistance, or coatings in general to lower friction or enhance other desirable properties of surfaces.

The examples provided herein are representative demonstrations of the invention described herein and are not intended to be limiting of the invention.

EXAMPLES

General

Triisobutyl aluminum (TIBAL) was purchased from Akzo Nobel and was used as received. Vinyl-terminated atactic polypropylene was synthesized as reported in U.S. Patent Application Publication No. 2009/0318644 A1 filed Jun. 20, 2008. Cab-o-sil™ ("Cabosil") EH-5 silica was purchased from Cabot Corp. and calcined at 200° C. overnight before use. All $^1$H NMR Spectra were taken on either a Bruker 400 MHz Spectrometer at room temperature or a Bruker 500 MHz at elevated temperature given for each reaction. All deuterated solvents were purchased from Cambridge Isotope Laboratories, Inc. and dried with 3 angstrom molecular sieves. Spectra were referenced to residual solvent protons.

Example 1

3:1 aPP:TIBAL→Cabosil→$CO_2$

In a 10 ml vial a 4.35 gram amount (about 2.32 mmol) of atactic polypropylene with an Mn of about 1800 g/mol and 95% vinyl termination was combined with triisobutyl aluminum (0.1584 g, 0.7987 mmol). The vial was capped and heated to 140° C. with stirring, creating a melt of the polymer and aluminum alkyl. The vial was vented after 30 min and left to stir overnight. Cabosil (0.3346 g) was added to the vial and the temperature was increased to 170° C. The vial stirred for 8 hrs, producing a smooth, uniform gel as in FIG. 2(2) (note that the white solid in the bottom of the vial in FIG. 2(2) is a magnetic stir bar. The vial was then loaded into a Parr bomb at 200 psi of $CO_2$ and heated to 210° C. overnight. The resulting material was a clear and viscous oil. Collected 3.7600 g.

Comparative Example 1

In a 10 ml vial a 4.37 g amount (about 2.32 mmol) of atactic polypropylene with an Mn of about 1800 g/mol and 95% vinyl termination was combined with a 0.314 gram amount of Cabosil and heated to 140° C. with attempted stirring, creating a melt of the polymer and aluminum alkyl. An opaque gel like mixture resulted, as shown in FIG. 2(1).

Example 2

(1:1 aPP:TIBA→Cabosil)

In a 10 ml vial a 1.81 gram amount (about 0.953 mmol) of atactic polypropylene with an Mn of about 1800 g/mol and 95% vinyl termination was combined with triisobutyl aluminum (0.126 g, 0.0984 mmol). The vial was capped and heated to 150° C. with stirring, creating a melt of the polymer and aluminum alkyl. After about 2 hrs the reaction was vented and heated for another 20 minutes. The reaction was further heated at 170° C., 30 min before adding Cabosil (0.1256 g) and heating at 170° C. for 2 hr. Collected 1.6388 g of viscous oil.

Example 3

3:1 iPP:TIBAL→Cabosil

In a 10 ml vial iPP (3.0349 g, 0.5324 mmol), Mn about 5000 and about 92% vinyl termination, and triisobutyl aluminum (36.8 mg, 0.186 mmol) were combined together and heated to 180° C., creating a melt of the polymer and aluminum alkyl. After about 1 hr the reaction is vented and then left to stir overnight. Cabosil (0.2299 g) was added and the vial heated to 210° C. The reaction stirred for 6 hr, after which the vial was placed in a Parr bomb and pressurized with 200 psi of $CO_2$. The Parr bomb was set in an oil bath set at 230° C. for 2 hr. Collected 2.8302 g of slightly opaque material.

NMR

Example 4

$(Isobutyl)_{3-n}Al-(aPP)_n$ 5.41 grams of aPP (Mn=1894, 99.9% vinyl) was placed in 20 ml vial. A 0.195 gram amount of triisobutyl aluminum was combined with the polymer and the reaction was heated to 170° C. for two hours under a nitrogen atmosphere with stirring. 5.15 grams of a clear gel were collected. $^1H$ NMR 400 MHz ($C_6D_6$): δ 0.28 (d, 0.83H), 0.44 (br s, 2.00H), 0.9-1.8 (mn, 278H), 4.56-5.92 (mn, 1.27H).

Example 5

$(Isobutyl)_{3-n}Al-(iPP)_n$ 0.6611 grams of iPP (Mn=6511, 94% vinyl termination) was placed in 20 ml vial. A 0.0457 gram amount of triisobutyl aluminum was combined with the polymer and the reaction was heated to 190° C. for two hours under a nitrogen atmosphere with stirring. 0.5511 grams of white solid was collected. $^1H$ NMR 500 MHz 360K (toluene-d8): δ 0.4 (br, 2.00H), 0.97 (br, d, 614H), 1.38 (quintet, 161H), 1.71 (septet, 151H).

Example 6

$(Isobutyl)_{3-n}Al-(PE)_n$ 1.6366 grams of PE (Mn=863, 82.5% vinyl) was placed in a 15 ml vial. A 0.1317 gram amount of triisobutyl aluminum was combined with the polymer and the reaction was heated to 190° C. for two hours under a nitrogen atmosphere with stirring. Collect 1.58 grams of white solid. $^1H$ NMR 500 Hz 355K (toluene-d8): δ 0.322 (br, 2H), 0.89-1.6 (mn, 131.56H), 5.4 (br, s, 0.10H).

Example 7

$(Isobutyl)_{3-n}Al-(EP)_n$ 5.1 grams of EP (Mn=1750, Mw=3061, 83% wt ethylene, 92% vinyl) was placed in a 15 ml vial. A 0.19 gram amount of triisobutyl aluminum was combined with the polymer and the reaction was heated to 190° C. for three hours and 40 minutes under a nitrogen atmosphere with stirring. 4.93 grams of white solid was collected. $^1H$ NMR 500 MHz 350K (toluene-d8): δ 0.30 (br, 2H), 0.89-1.58 (m, 361.3H), 5.41 (s, 0.65H).

Example 8

$[(IsobutylO)_{3-n}Al—O(aPP)_n]_x$

In a 20 mL vial, aPP (5.4153 g, 2.860 mmol) and TIBAL (0.195 g, 0.985 mmol) were combined together at 170° C. for 2 hr. $Me_3NO$ (0.199 g, 2.65 mmol) was added to the reaction. The reaction stirs overnight with the cap off at 230° C. Smoke was observed. The product yellowed overnight. Collect 4.69 g of yellowish gel. $^1H$ NMR 400 MHz ($C_6D_6$): δ 0.8-1.7 (mn, 240H), 3.8-4.3 (br, mn, 2.00H), 4.7-5.8 (mn, 1.26H).

Example 9

$[(IsobutylO)_{2-n}Al—O(aPP)_n]_x$-Cabosil

In a 20 mL, vial aPP (3.2208 g, 1.701 mmol) is combined with TIBAL (0.1280 g, 0.6454 mmol) and stirred together for 2 hr and 40 min at 180° C. Cabosil (0.2143 g) was added to the gel and stirred at 190° C. for 1 hr. $Me_3NO$ (0.1058 g, 1.409 mmol) was then added to the gel which was stirred overnight at 230° C. An NMR measurement was performed on the clear gel/liquid, and a signal was obtained but it is not clear if this signal is from residual aluminum polymeryl, the modified Cabosil, or some combination thereof: $^1H$ NMR 400 MHz ($C_6D_6$): δ 0.9-1.7 (mn, 1676.07H), 4.8-5.1 (br, mn, 1.31H), 5.1-5.4 (br, mn, 2.00H), 5.75(br, 0.174H).

Additional Examples

Example 10

$EP-OAl(OCH_2CHMe_2)_2(NMe_3)$

EP macromer (48 g, Mn=6635 g/mol, 80% vinyl chain ends) was dissolved in 200 ml toluene. DIBAL AlH $(CH_2CHMe_2)_2$, (1.03 g, 99% Aldrich) was added and the reaction was heated to 100° C. A 2 hr aliquot indicated that all vinyl chain ends had been consumed.

$^1H$ NMR (500 MHz, $C_2D_2Cl_4$) δ ppm; 5.1 (0.1 H), 4.9 to 4.7 (0.2 H), 2.2 to 0.5 (1080 H), 0.45 to 0.10 (6 H).

The reaction was allowed to stir an additional 2 hrs and $Me_3NO$ (1.8 g) was added to the reaction mixture. The reaction was cooled and allowed to stir over the weekend (about 48 hrs). An aliquot indicated that very little reaction had occurred. $^1H$ NMR (500 MHz, $C_2D_2Cl_4$) δ ppm; 2.2 to 0.5 (1112 H), 0.45 to 0.1 (6 H). The reaction mixture was heated to 100° C. An aliquot at 15 hrs indicated the reaction was 83% complete based on the reduction in the resonances from 0.45 to 0.1 ppm. An aliquot at 48 hrs indicated the reaction was 99% complete. $^1$H NMR (500 MHz, $C_2D_2Cl_4$) δ ppm; 3.48 to 3.44 (m, 3.4 H), 3.44 to 3.40 (m, 2.0 H), 3.22 (s, 9.0), 2.2 to 0.5 (m, 631 H).

Example 11

EP-I

EP macromer (20 g, Mn=6635 g/mol, 80% vinyl chain ends) was dissolved in 200 ml heptane. DIBAL AlH $(CH_2CHMe_2)_2$, (0.45 g, 99% Aldrich) was added and the reaction was heated to 90° C. for 15 hrs. An aliquot indicated that all vinyl chain ends had been consumed. The reaction mixture was cooled to room temperature and solid $I_2$ (2.7 g) was added. After 1 hr an aliquot was analyzed and indicated that all resonances from 0.45 to 0.1 ppm were absent. $^1$H NMR (500 MHz, $C_2D_2Cl_4$) δ ppm; 3.2 (m, 1 H), 2.0 to 0.5 (752 H). The volatiles were reduced in vacuo to yield a viscous oily product.

Thus, having described the various features of the polymeryls and solvent-solubilized surfaces of the inventions, described here in numbered embodiments are:

1. A metal polymeryl comprising compounds having the general formula:
   $MR_{3-n}R'_n$; wherein each R group is a hydrogen or $C_1$ to $C_{10}$ or $C_{20}$ alkyl, and each R' group is selected from propylene-based polymers having an Mn of at least 300 g/mole; n is 1, 2, or 3; and M is a Group 12 or 13 metal, preferably aluminum or zinc;
   wherein the first portion of the R' group bound to the metal M is a —$CH_2CH_2$— group, and the terminal portion of the R' group is isobutyl.
2. The metal polymeryl of numbered embodiment 1, wherein the polymeryl is formed into metal alkyl or metal alkoxide clusters.
3. The metal polymeryl of numbered embodiments 1 and 2, wherein the polymeryl is combined with a surface comprising hydroxyl moieties.
4. The metal polymeryl of numbered embodiment 3, wherein the surface comprises particles of silica, silica-alumina, alumina, (and spray-dried versions thereof) glass, clay; glass fibers; glass surfaces; graphene oxide, carbon black; calcium carbonate; oxidized polyolefin films; and metal surfaces.
5. The metal polymeryl of any one of the previous numbered embodiments, wherein the propylene-based polymer is a homopolymer of propylene or copolymer of propylene and ethylene or $C_4$ to $C_{10}$ α-olefin.
6. The metal polymeryl of numbered embodiment 5, wherein the propylene-based polymer is selected from isotactic polypropylene, atactic polypropylene, syndiotactic polypropylene, and propylene-ethylene copolymers (random, elastomeric, and/or block).
7. The metal polymeryl of any one of the previous numbered embodiments, further comprising combining an oxidizing agent to the metal polymeryl; wherein the oxidizing agent is oxygen or amine-N-oxide.
8. The metal polymeryl of any one of the previous numbered embodiments, wherein the propylene-based polymer has an Mn value within the range of from 300 or 400 or 500 g/mole to 20,000 or 30,000 or 40,000 or 50,000 or 100,000 or 200,000 or 300,000 g/mole.
9. A high dielectric permittivity material comprising the metal polymeryl of any one of the previous numbered embodiments.
10. A polymer-solubilized surface "S" comprising multiple hydroxyl groups ("S—OH"), wherein at least one of the hydroxyl groups is modified according to the formula:

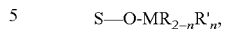
   $S-O-MR_{2-n}R'_n$, wherein each R group is a hydrogen or $C_1$ to $C_{10}$ or $C_{20}$ alkyl, and each R' group is a polymer having an Mn of at least 300 g/mole; n is 1 or 2; and M is a Group 12 or 13 metal, preferably aluminum or zinc.
11. A polymer-solubilized surface comprising the reaction product of:
    a surface comprising hydroxyl moieties and an metal polymeryl $MR_{3-n}R'_n$; wherein each R group is a hydrogen or $C_1$ to $C_{10}$ or $C_{20}$ alkyl, and each R' group is a polymer having an Mn of at least 300 g/mole; n is 1, 2, or 3; and M is a Group 12 or 13 metal, preferably aluminum or zinc.
12. The polymer-solubilized surface of numbered embodiments 10 and 11, wherein R' is selected from isotactic polypropylene, atactic polypropylene, syndiotactic polypropylene, polyethylene, ethylene-propylene copolymers, and combinations thereof, each having an Mn of at least 300 g/mole.
13. The polymer-solubilized surface of numbered embodiments 10 to 12, wherein R is selected from $C_3$ to $C_6$ alkyls.
14. The polymer-solubilized surface of any one of the previous numbered embodiments 10 to 13, wherein the polymer has an Mn value within the range of from 300 or 400 or 500 g/mole to 20,000 or 30,000 or 40,000 or 50,000 or 100,000 or 200,000 or 300,000 g/mole.
15. The polymer-solubilized surface of any one of the previous numbered embodiments 10 to 14, wherein the polymer is a homopolymer of propylene or copolymer of propylene and ethylene or $C_4$ to $C_{10}$ α-olefin.
16. The polymer-solubilized surface of any one of the previous numbered embodiments 10 to 15, further comprising combining an oxidizing agent to the metal polymeryl; wherein the oxidizing agent is oxygen or an amine-N-oxide.
17. A nanocomposite comprising the polymer-solubilized surface of any one of the previous numbered embodiments 10 to 16 and a polyolefin or elastomer having an Mn of at least 10,000 g/mole.
18. A coating comprising the polymer-solubilized surface of any one of the previous numbered embodiments 10 to 17.
19. An aluminum polymeryl derived from vinyl-terminated propylene-based polymers of any of the previous numbered embodiments possessing a characteristic $^1$H NMR signal for the Al—$\underline{C}H_2CH_2$(polymer) and is within the range of δ from 0.25 or 0.30 or 0.32 to 0.40 or 0.42 or 0.45 ppm (broad) under the conditions described in the examples; once the aluminum polymeryl has reacted with an oxidizing agent the characteristic $^1$H NMR signal Al—O$\underline{C}H_2CH_2$(polymer) is within the range of δ from 3.2 or 3.5 or 3.8 to 4.2 or 4.5 or 4.8 ppm (broad).
20. The use of the polymeryl or polymer-solubilized surface of any one of the previous numbered embodiments as a filler in a nanocomposite or coating on a solid surface.

The invention claimed is:
1. A metal polymeryl that is the product of combining compounds having the general formula:
   $MR_{3-n}R'_n$; wherein each R group is a hydrogen or C1 to C20 alkyl, and each R' group is selected from propylene-based polymers having an Mn of at least 300 g/mole; n is 1, 2, or 3; and M is a Group 12 or 13 metal, and
   an oxidizing agent;

wherein the first portion of the R' group bound to the metal M is a —OCH$_2$CH$_2$— group, and the terminal portion of the R' group is isobutyl.

2. The metal polymeryl of claim 1, wherein the polymeryl is combined with a surface comprising hydroxyl moieties.

3. The metal polymeryl of claim 2, wherein the surface comprises particles of silica, silica-alumina, alumina, and spray-dried versions of each, glass, clay, glass fibers, glass surfaces, graphene oxide, carbon black, calcium carbonate, oxidized polyolefin films, and metal surfaces.

4. The metal polymeryl of claim 1, wherein the propylene-based polymer is a homopolymer of propylene or copolymer of propylene and ethylene or C$_4$ to C$_{10}$ α-olefin.

5. The metal polymeryl of claim 4, wherein the propylene-based polymer is selected from isotactic polypropylene, atactic polypropylene, syndiotactic polypropylene, and propylene-ethylene copolymers.

6. The metal polymeryl of claim 1, wherein the propylene-based polymer has an Mn value within the range of from 300 or 400 or 500 g/mole to 20,000 or 30,000 or 40,000 or 50,000 or 100,000 or 200,000 or 300,000 g/mole.

7. A high dielectric permittivity material comprising the metal polymeryl of claim 1.

8. A polymer-solubilized surface "S" comprising multiple hydroxyl groups ("S—OH"), wherein at least one of the hydroxyl groups is modified according to the formula:

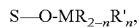

S—O-MR$_{2-n}$R'$_n$, wherein each R group is a hydrogen or C$_1$ to C$_{20}$ alkyl, and each R' group is a polymer having an Mn of at least 300 g/mole; n is 1 or 2; and M is a Group 12 or 13 metal.

9. The polymer-solubilized surface of claim 8, wherein R' is selected from isotactic polypropylene, atactic polypropylene, syndiotactic polypropylene, polyethylene, ethylene-propylene copolymers, and combinations thereof.

10. The polymer-solubilized surface of claim 8, wherein R is selected from C$_3$ to C$_6$ alkyls.

11. The polymer-solubilized surface of claim 8, wherein the polymer has an Mn value within the range of from 300 or 400 or 500 g/mole to 20,000 or 30,000 or 40,000 or 50,000 or 100,000 or 200,000 or 300,000 g/mole.

12. The polymer-solubilized surface of claim 8, wherein the polymer is a homopolymer of propylene or copolymer of propylene and ethylene or C$_4$ to C$_{10}$ α-olefin.

13. A polymer-solubilized surface of claim 8, wherein the polymeryl is further combined with an oxidizing agent thereby resulting in the R' group bound to the metal M becoming a —OCH$_2$CH$_2$— group.

14. A nanocomposite comprising the polymer-solubilized surface of claim 8 and a polyolefin or elastomer having an Mn of at least 10,000 g/mole.

15. A coating comprising the polymer-solubilized surface of claim 8.

16. A polymer-solubilized surface comprising the reaction product of:
a surface comprising hydroxyl moieties and a metal polymeryl MR$_{3-n}$R'$_n$; wherein each R group is a hydrogen or C$_1$ to C$_{20}$ alkyl, and each R' group is a polymer having an Mn of at least 300 g/mole; n is 1, 2, or 3; and M is a Group 12 or 13 metal.

17. A polymer-solubilized surface of claim 16, wherein the polymer-solubilized surface is further combined with an oxidizing agent resulting in the R' group bound to the metal M becoming a —OCH$_2$CH$_2$— group.

18. The polymer-solubilized surface of claim 16, wherein the surface comprises solvent-insoluble particles comprising surface hydroxyl moieties or one or more macroscopic surfaces having surface hydroxyl moieties.

19. The polymer-solubilized surface of claim 16, wherein the surface comprises particles of silica, silica-alumina, alumina, and spray-dried versions of each, glass, clay, glass fibers, glass surfaces, carbon black, graphene oxide, calcium carbonate, oxidized polyolefin films, or metal surfaces.

20. The polymer-solubilized surface of claim 16, wherein R' is selected from isotactic polypropylene, atactic polypropylene, syndiotactic polypropylene, polyethylene, ethylene-propylene copolymers, and combinations thereof.

21. The polymer-solubilized surface of claim 16, wherein R is selected from C$_3$ to C$_6$ alkyls.

22. The polymer-solubilized surface of claim 16, wherein the metal polymeryl MR$_{3-n}$R'$_n$ is the reaction product of MR$_3$ and vinyl-terminated polyolefins selected from isotactic polypropylene, atactic polypropylene, syndiotactic polypropylene, polyethylenes, propylene-ethylene copolymers, and combinations thereof.

23. The polymer-solubilized surface of claim 16, wherein the polymer has an Mn value within the range of from 300 or 400 or 500 g/mole to 20,000 or 30,000 or 40,000 or 50,000 or 100,000 or 200,000 or 300,000 g/mole.

* * * * *